(12) United States Patent
Zhou et al.

(10) Patent No.: US 9,793,998 B2
(45) Date of Patent: Oct. 17, 2017

(54) OPTICAL TRANSMIT SYSTEM

(71) Applicant: Huawei Technologies Co., Ltd., Shenzhen (CN)

(72) Inventors: Min Zhou, Shenzhen (CN); Huafeng Lin, Shenzhen (CN); Lei Zhou, Shenzhen (CN); Zhenxing Liao, Wuhan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 8 days.

(21) Appl. No.: 15/082,515

(22) Filed: Mar. 28, 2016

(65) Prior Publication Data

US 2016/0241342 A1    Aug. 18, 2016

Related U.S. Application Data

(63) Continuation of application No. PCT/CN2013/084363, filed on Sep. 26, 2013.

(51) Int. Cl.
*H04B 10/00* (2013.01)
*H04B 10/50* (2013.01)
(Continued)

(52) U.S. Cl.
CPC ....... *H04B 10/50577* (2013.01); *H01S 3/005* (2013.01); *H01S 3/302* (2013.01);
(Continued)

(58) Field of Classification Search
CPC .......... H04B 10/50577; H04B 10/2537; H04B 10/548; H01S 3/005; H01S 3/302; H01S 3/0057; H01S 3/30; H01S 3/2308
(Continued)

(56) References Cited

U.S. PATENT DOCUMENTS 5,477,368 A * 12/1995 Eskildsen .......... H04B 10/2537
                                                        359/334
5,515,192 A    5/1996 Watanabe
(Continued)

FOREIGN PATENT DOCUMENTS

CN    1694383 A    11/2005
CN    101150369 A    3/2008
(Continued)

OTHER PUBLICATIONS

Song, "Enlargement of measurement range in a Brillouin optical correlation domain analysis system using double lock-in amplifiers and a single-sideband modulator" IEEE Photonics Technology Letters, Year: 2006, vol. 18, Issue: 3, pp. 499-501.*
(Continued)

*Primary Examiner* — Juan A Torres
(74) *Attorney, Agent, or Firm* — Conley Rose, P.C.

(57) ABSTRACT

An optical transmit system, including a direct modulator configured to generate an optical signal, an optical amplifier coupled to the direct modulator configured to amplify the optical signal output by the direct modulator, and a stimulated Brillouin scattering component coupled to the optical amplifier configured to limit optical power of the optical signal output by the optical amplifier, where a stimulated Brillouin scattering threshold of the stimulated Brillouin scattering component is equal to minimum optical power of a part, which needs to be limited, of the optical signal output by the optical amplifier, and the stimulated Brillouin scattering component reflects, using a stimulated Brillouin scattering frequency difference, a part, which has optical power higher than the minimum optical power, of the optical signal output by the optical amplifier in order to limit outputting of this part of the optical signal.

20 Claims, 5 Drawing Sheets

(51) Int. Cl.
*H01S 3/30* (2006.01)
*H01S 3/00* (2006.01)
*H04B 10/548* (2013.01)
*H04B 10/2537* (2013.01)
*H01S 3/23* (2006.01)

(52) U.S. Cl.
CPC ....... *H04B 10/2537* (2013.01); *H04B 10/548* (2013.01); *H01S 3/0057* (2013.01); *H01S 3/2308* (2013.01); *H01S 3/30* (2013.01)

(58) Field of Classification Search
USPC .......................................................... 398/188
See application file for complete search history.

(56) References Cited

U.S. PATENT DOCUMENTS

| | | | | |
|---|---|---|---|---|
| 5,598,289 | A * | 1/1997 | Watanabe | H04B 10/071 359/334 |
| 5,892,607 | A * | 4/1999 | Atlas | H04B 10/2537 359/279 |
| 5,900,959 | A * | 5/1999 | Noda | H04B 10/2537 398/147 |
| 6,600,593 | B2 * | 7/2003 | Pedersen | H01S 3/302 359/334 |
| 7,796,654 | B2 * | 9/2010 | Murison | B23K 26/0622 372/25 |
| 8,134,775 | B2 * | 3/2012 | Suzuki | H01S 3/302 359/334 |
| 2002/0145794 | A1 * | 10/2002 | Pedersen | H01S 3/302 359/337 |
| 2005/0271396 | A1 | 12/2005 | Iannelli | |
| 2009/0080477 | A1 * | 3/2009 | Murison | B23K 26/0622 372/25 |
| 2009/0237779 | A1 * | 9/2009 | Suzuki | H04B 10/2916 359/334 |
| 2011/0206076 | A1 * | 8/2011 | Murison | B23K 26/0622 372/28 |
| 2013/0215494 | A1 * | 8/2013 | Shin | H01S 3/2316 359/326 |

FOREIGN PATENT DOCUMENTS

| | | |
|---|---|---|
| CN | 101604108 A | 12/2009 |
| CN | 102570256 A | 7/2012 |

OTHER PUBLICATIONS

Tonda-Goldstein, S., et al., "Stimulated Brillouin scattering for microwave signal modualtion depth increase in optical links," Electronics Letters, vol. 36, No. 11, May 25, 2000, 2 pages.
"Generation of flat-top waveform in the time domain based on stimulated Brillouin scattering," Applied Physics B 90, Lasers and Optics, 2008, pp. 503-506.
Foreign Communication From a Counterpart Application, European Application No. 13894244.6, Extended European Search Report dated Sep. 6, 2016, 9 pages.
Partial English Translation and Abstract of Chinese Patent Application No. CN101604108, Mar. 29, 2016, 5 pages.
Rakich, P., et al., "Giant Enhancement of Stimulated Brillouin Scattering in the Subwavelength Limit," Physical Review X, 2012, 16 pages.
Hansryd, J., et al., "Increase of the SBS Threshold in a Short Highly Nonlinear Fiber by Applying a Temperature Distribution," Journal of Lightwave Technology, vol. 19, No. 11, Nov. 2001, pp. 1691-1697.
Pant, R., et al., "On-Chip stimulated Brillouin scattering," Optics Express 8285, vol. 19, No. 9, Apr. 25, 2011, 6 pages.
Agrawal, G., et al., "Self-Phase Modulation and Spectral Broadening of Optical Pulses in Semiconductor Laser Amplifiers," IEEE Journal of Quantum Electronics, vol. 25, No. 11, Nov. 1989, 10 pages.
Anfray, T., et al., "Simulation of SSB-LC with D-EML for Extended PON Beyond the Chromatic Dispersion Limit," Journal of Lightwave Technology, vol. 30, No. 19, Oct. 1, 2012, pp. 3089-3095.
Lee, H., et al., "Theoretical Study of Frequency Chirping and Extinction Ratio of Wavelength-Converted Optical Signals by XGM and XPM Using SOA's," IEEE Journal of Quantum Electronics, vol. 35, No. 8, Aug. 1999, pp. 1213-1219.
Foreign Communication From a Counterpart Application, PCT Application No. PCT/CN2013/084363, English Translation of International Search Report dated Jun. 30, 2014, 2 pages.
Foreign Communication From a Counterpart Application, PCT Application No. PCT/CN2013/084363, English Translation of Written Opinion dated Jun. 30, 2014, 8 pages.

* cited by examiner

OPTICAL TRANSMIT SYSTEM

CROSS-REFERENCE TO RELATED APPLICATIONS

This application is a continuation of International Application No. PCT/CN2013/084363, filed on Sep. 26, 2013 which is hereby incorporated by reference in its entirety.

TECHNICAL FIELD

The present disclosure relates to communications technologies, and in particular, to an optical transmit system.

BACKGROUND

As "out with the Copper, in with the Fiber" gradually becomes a mainstream access manner of a network technology, and an optical access technology has been widely used. A passive optical network (PON) technology is an optical access technology based on point-to-multipoint (P2MP). A PON system mainly includes an optical line terminal (OLT) located in a central office and multiple optical network units (ONUs) located on a user side, where the OLT and the multiple ONUs are connected using an optical distribution network. A direction from the OLT to the ONU is defined as a downstream direction, and a direction from the ONU to the OLT is an upstream direction. The OLT sends a downstream optical signal to the multiple ONUs using the optical distribution network, and receives upstream optical signals from the ONUs. Correspondingly, each ONU receives a downstream optical signal from an OLT and sends an upstream optical signal to the OLT. In an upstream PON based on a time division multiple access manner, multiple ONUs send upstream optical signals through bursts (that is, send upstream burst optical signals), to reduce conflicts between the multiple ONUs.

An optical transmitter in a PON system mainly uses two modulation schemes, an external modulation and a direct modulation.

Figure 1:
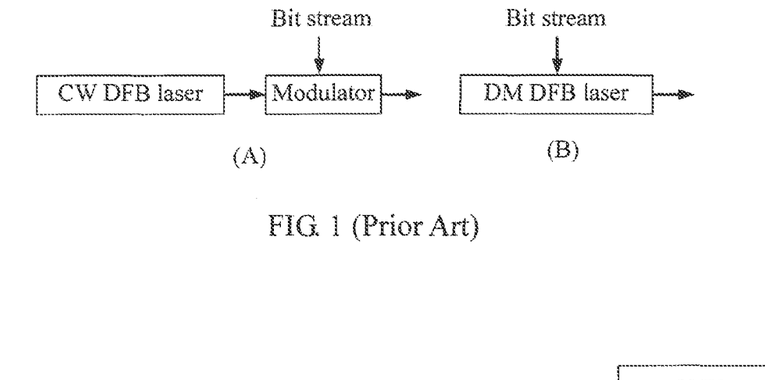
FIG. 1A and FIG. 1B show a conventional optical transmit system.

In an optical transmit system using external modulation, a laser and a modulator are independent, output light of the laser is injected into the modulator, and a bit stream (or an electrical drive signal) is used as a modulation signal to control the modulator such that a parameter of output light of the laser changes with the modulation signal. For example, the modulation signal may control the modulator such that an intensity or a phase of the output light of the laser changes with the modulation signal. Furthermore, an acousto-optic or electro-optic effect of the modulator may be used to control parameters of light. In an external modulation solution, because the laser works in a quiescent direct current state, an output optical signal has a small frequency chirp and high transmission performance. FIG. 1A shows a typical optical transmit system using external modulation, where a continuous wave distributed feedback (CW DFB) laser and an electro-absorption modulator form an electro-absorption modulated laser (EML). An optical signal output by the EML has a small frequency chirp and can well resolve a signal distortion problem caused by dispersion. However, the EML is high-cost, and causes a relatively large insertion loss (6 decibel (dB) to 8 dB) and also causes the insertion loss to remain high.

In an optical transmit system using direct modulation, an output optical signal of a direct modulated laser (DML) is changed by controlling a modulation current (that is, an injection current) of a DML. FIG. 1B shows a typical optical transmit system using direct modulation. A direct modulated distributed feedback (DM DFB) laser is one type of DML and is generally a semiconductor laser. The DM DFB laser has a simple structure, and is easy to implement and cost-effective.

SUMMARY

Embodiments of the present disclosure provide an optical transmit system in order to provide an enough power budget and an optical transmit signal having a good waveform property.

According to one aspect of the present disclosure, an optical transmit system includes a direct modulator configured to generate an optical signal, an optical amplifier coupled to the direct modulator configured to amplify the optical signal output by the direct modulator, and a stimulated Brillouin scattering component coupled to the optical amplifier configured to limit optical power of the optical signal output by the optical amplifier, where a stimulated Brillouin scattering threshold of the stimulated Brillouin scattering component is equal to minimum optical power of a part, which needs to be limited, of the optical signal output by the optical amplifier, and the stimulated Brillouin scattering component reflects, using a stimulated Brillouin scattering frequency difference, a part, which has optical power higher than the minimum optical power, of the optical signal output by the optical amplifier in order to limit outputting of this part of the optical signal.

According to another aspect of the present disclosure, an optical transmit system includes a direct modulator configured to generate an optical signal, a semiconductor optical amplifier coupled to the direct modulator configured to amplify the optical signal output by the direct modulator, and a stimulated Brillouin scattering component coupled to the semiconductor optical amplifier configured to limit optical power of the optical signal output by the semiconductor optical amplifier, where a ratio of a stimulated Brillouin scattering threshold of the stimulated Brillouin scattering component to a pulse peak baseline value of the semiconductor optical amplifier when the semiconductor optical amplifier works in a saturation region is greater than or equal to 1 and less than or equal to 115%, and the stimulated Brillouin scattering component reflects, using a stimulated Brillouin scattering frequency difference, a part, which has optical power higher than the stimulated Brillouin scattering threshold, of the optical signal output by the optical amplifier in order to limit outputting of this part of the optical signal.

According to another aspect of the present disclosure, a working point of a semiconductor optical amplifier is set in or close to a saturation region.

By means of the solutions of the present disclosure, an enough power budget can be provided and a signal having excessively high amplitude can be suppressed in order to obtain an optical transmit signal having a good waveform property.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes in detail the optical transmit system provided in the embodiments of the present disclosure and an application of the optical system with reference to specific embodiments.

Figure 2:
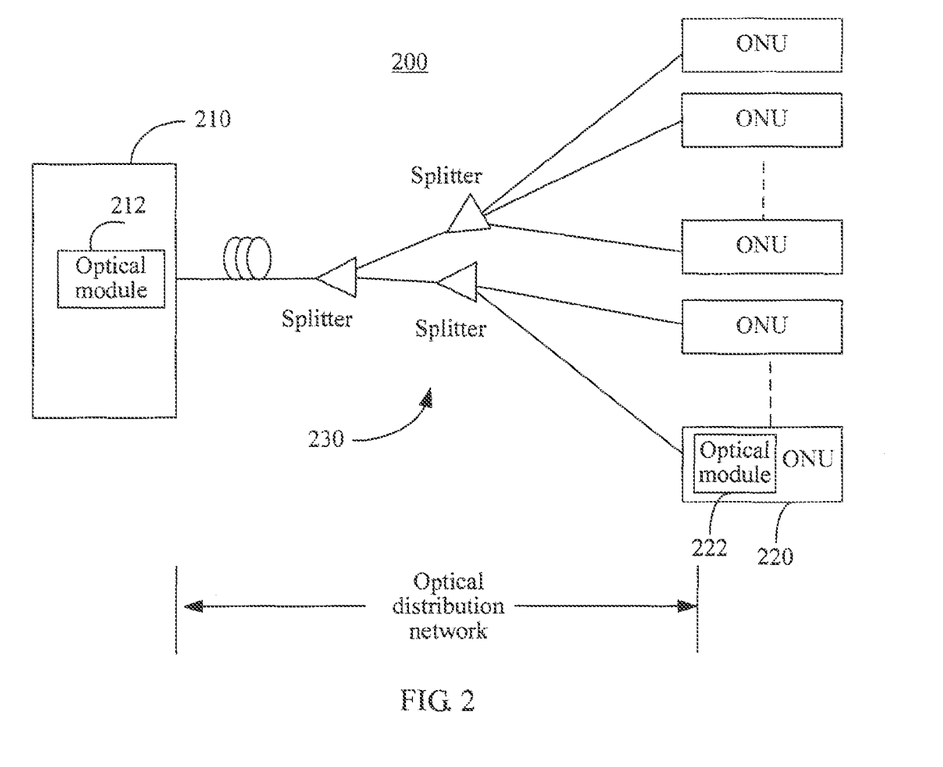
FIG. 2 is a schematic diagram of a PON system according to an embodiment of the present disclosure.

Referring to FIG. 2, which is a schematic structural diagram of a PON system, the PON system 200 includes an OLT 210, an ONU 220, and an optical distribution network 230. The OLT 210 is connected to the ONU 220 using the optical distribution network 230. The OLT 210 is connected to or communicates with multiple ONUs 220 in a P2MP manner. A direction from the OLT 210 to the ONU 220 is a downstream direction, and a direction from the ONU 220 to the OLT 210 is an upstream direction.

The optical distribution network 230 may implement data distribution between the OLT 210 and the ONU 220 without any active components. In an embodiment, data distribution between the OLT 210 and the ONU 220 may be implemented using a passive optical component (for example, an optical splitter) in the optical distribution network 230.

The OLT 210 is usually located at a central position (for example, a central office (CO)), and may uniformly manage multiple ONUs 220 and transmit data between the multiple ONUs 220 and an upper-layer network (not shown in the figure). Furthermore, the OLT 210 may function as a medium between the multiple ONUs 220 and the upper-layer network (for example, one or more of an Internet network, an asynchronous transfer mode (ATM) network, and a public switched telephone network), and forward data received from the upper-layer network to the multiple ONUs 220 and forward data received from the multiple ONUs 220 to the upper-layer network. A specific structure configuration of the OLT 210 may vary with a specific type of the PON system 200, for example, in an embodiment, the OLT 210 may include a downstream transmitter and an upstream receiver, where the downstream transmitter is configured to send a downstream optical signal to the ONU, and the upstream receiver is configured to receive an upstream optical signal from the ONU, where the downstream optical signal and the upstream optical signal may be transmitted using the optical distribution network. Moreover, each or a combination of the downstream transmitter and the upstream receiver may be independently configured as a hot-swappable optical module, such as an optical module 212 shown in FIG. 2. In addition, in an embodiment, the optical module 212 may be further coupled to a detection module, where the detection module may be configured to detect a performance parameter of the optical module, for example, detect one or more of parameters of a working voltage, transmit optical power, receive optical power, a temperature, and the like of the optical module. The downstream transmitter or the optical module in this specification may be configured as an optical sub-assembly, for example, a transmitter optical sub-assembly (TOSA). The upstream receiver or the optical module may be configured as an optical sub-assembly, for example, a receiver optical sub-assembly (ROSA), and a transceiver or the optical module may be configured as an optical sub-assembly, for example, a bi-directional optical sub-assembly (BOSA). Typically, each of the TOSA, the ROSA, and the BOSA is an integrally packaged optical sub-assembly.

The multiple ONUs 220 may be distributed at positions on a user side (for example, customer premises). Each ONU 220 may be a network device configured to communicate with the OLT 210 and a user. Furthermore, the ONU 220 may function as a medium between the OLT 210 and the user. For example, the ONU 220 may forward data received from the OLT 210 to the user, and forward data received from the user to the OLT 210. A specific structure configuration of the ONU 220 may vary with a specific type of a PON system 200, for example, the ONU 220 may also include an upstream transmitter and a downstream receiver, where the upstream transmitter is configured to send an upstream optical signal to the OLT 210, and the downstream receiver is configured to receive a downstream optical signal from the OLT 210. Moreover, each or a combination of the downstream receiver and the upstream transmitter may be independently configured as a hot-swappable optical module, such as an optical module 222 shown in FIG. 2. The optical module 222 and the optical module 212 form a receive and transmit pair in a transmission direction. In addition, the optical module 222 may be further coupled to a detection module, where the detection module may be configured to detect a performance parameter of the optical module, for example, detect one or more of parameters of a working voltage, transmit optical power, receive optical power, a temperature, and the like of the optical module. Similarly, the downstream receiver, the upstream transmitter, or a combination of the downstream receiver and the upstream transmitter in this specification may be an optical sub-assembly, and the downstream receiver, the upstream transmitter, and a transceiver may respectively correspond to an ROSA, a TOSA, and a BOSA. It should be understood that, a structure of the ONU 220 is similar to that of an optical network terminal (ONT), and therefore, in the solution provided in this application, the ONU and the ONT are interchangeable.

The optical distribution network 230 may be an optical signal distribution system, and the optical signal distribution system may include a fiber, an optical coupler, an optical splitter, and/or another device. In an embodiment, the fiber, the optical coupler, the optical splitter, and/or another device may be passive optical components, that is, components that distribute an optical signal between the OLT 210 and the ONU 220 without a power supply support. In addition, in another embodiment, the optical distribution network 230 may further include one or more processing devices, for example, an optical amplifier or an optical-to-electrical-to-optical converter. In a branch structure shown in FIG. 2, the optical distribution network 230 may extend from an output end of the OLT 210 to input ends of the multiple ONUs 220. FIG. 2 schematically provides a structure of the optical distribution network 230 including three splitters. However, an optical distribution network may be also any other P2MP structure, for example, a structure including only one splitter connected to multiple ONUs 220.

The PON system 200 may be an asynchronous transfer mode passive optical network (ATM PON) system or a broadband passive optical network (BPON) system defined in the International Telecommunication Union telecommunication standardization sector (ITU-T) G.983 standard, a gigabit-capable passive optical network (GPON) system defined in the ITU-T G.984 standard, an Ethernet passive optical network (EPON) defined in the Institute of Electrical and Electronics Engineers (IEEE) 802.3ah standard, or a next-generation PON (such as a 10 G-GPON defined in the ITU-T G.987 standard or a 10 G-EPON defined in the IEEE 802.3av standard). Herein, 10 G is for 10 gigabits per second and represents a transmission rate). All content of various PON systems defined in the foregoing standards is incorporated by reference in this application.

Figure 3:
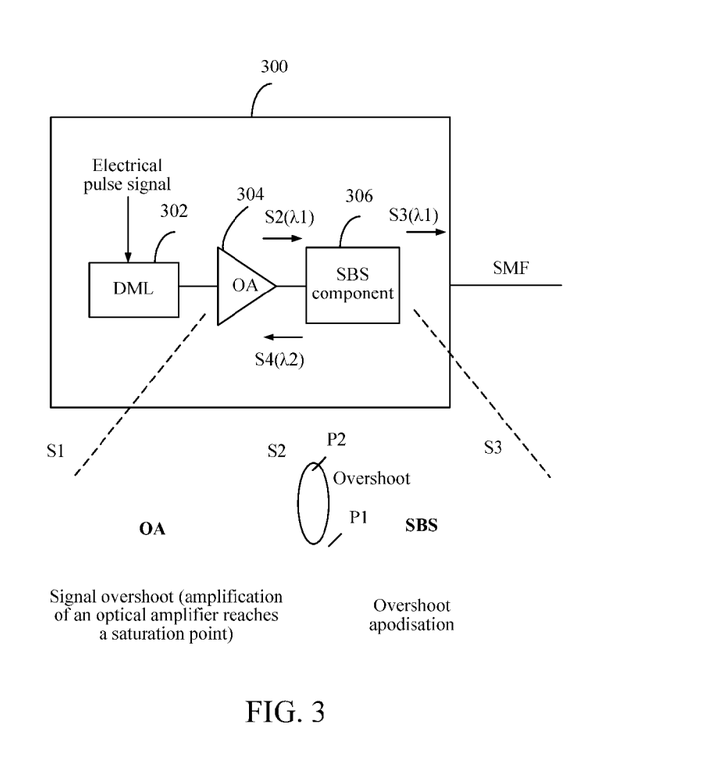
FIG. 3 is a schematic diagram of an optical transmit system according to an embodiment of the present disclosure.

Referring to FIG. 3, FIG. 3 is a schematic diagram of an optical transmit system according to an embodiment of the present disclosure. The optical transmit system shown in FIG. 3 may be applied to any one or more of an access network, a metropolitan area network, and a backbone network, for example, either device of the OLT 210 and the ONU 220 shown in FIG. 2. Generally, the optical transmit system provided in this embodiment of the present disclosure is applicable to medium-and-long distance transmission, for example, transmission of tens of kilometers of an optical access network and transmission of tens and even hundreds of kilometers of a metropolitan area network and a backbone network.

Referring to FIG. 3, the optical transmit system 300 includes a DML 302, an optical amplifier (OA) 304, and a stimulated Brillouin scattering (SBS) component 306.

The DML 302 is configured to generate an optical signal. The OA 304 is coupled to the DML 302 and is configured to amplify the optical signal input to the OA 304 and output an amplified optical signal. The SBS component 306 is coupled to the OA 304 and is configured to limit optical power of the optical signal output by the OA 304. An SBS threshold of the SBS component 306 is equal to minimum optical power of a part, which needs to be limited, of the optical signal output by the optical amplifier, and the SBS component 306 reflects, using a SBS frequency difference, a part, which has optical power higher than the minimum optical power, of the optical signal output by the OA 304 in order to limit outputting of this part of the optical signal. Herein, the SBS threshold is an optical property of the SBS component, and light reflected using the SBS frequency difference is referred to as Stokes light. In this embodiment of the present disclosure, the SBS component 306 is used as a limiter to allow outputting of a part, which has optical power lower than the minimum optical power, of the optical signal output by the OA 304 and limit outputting of a part having optical power higher than the minimum optical power. The SBS component is a passive optical component, has a good optical property, and has a small effect on a waveform of an effective optical signal, thereby reducing waveform distortion.

Figure 4:
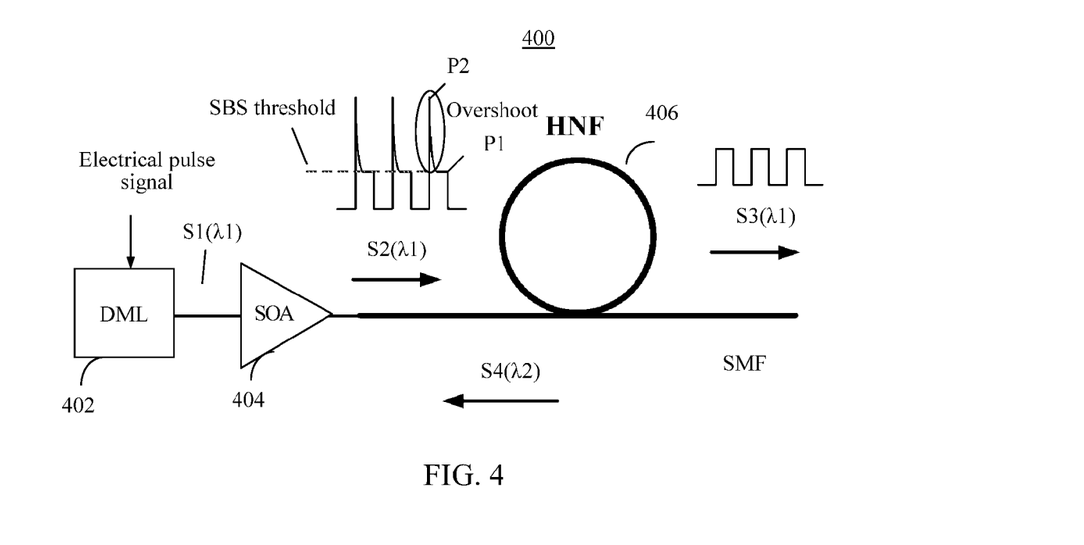
FIG. 4 is a schematic diagram of an optical transmit system according to another embodiment of the present disclosure.
Figure 6A:
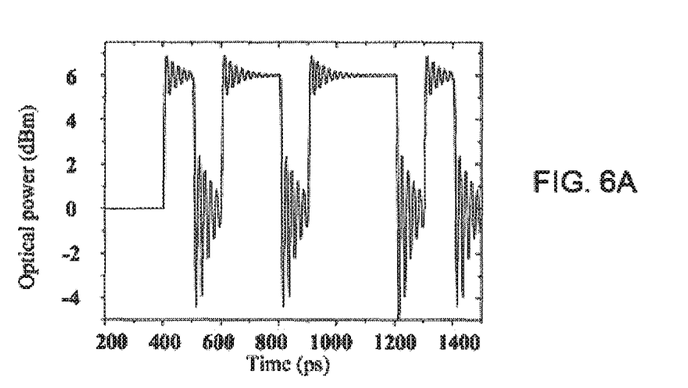
FIG. 6A, FIG. 6B and FIG. 6C are schematic timing diagrams of an optical pulse signal according to an embodiment of the present disclosure.
Figure 6B:
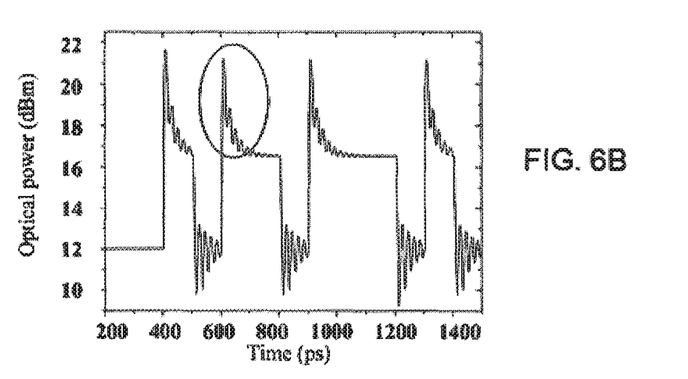
Figure 6C:
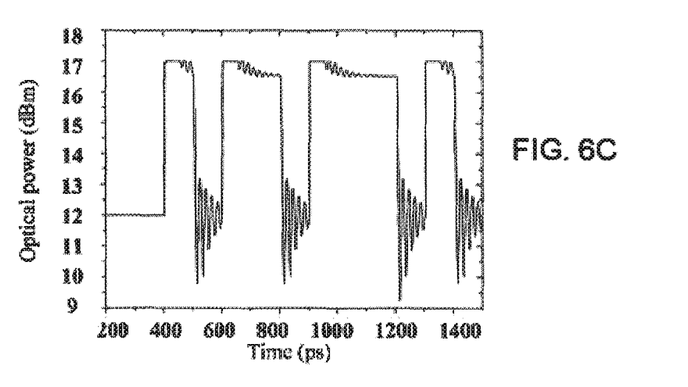

According to an embodiment of the present disclosure, a pulse peak generated or output by the OA 304 includes an overshoot part, that is, a part having optical power higher than a preset peak value. As shown in FIG. 3, an optical pulse signal S1, an optical pulse signal S2, and an optical pulse signal S3 respectively are examples of optical signals output by the DML 302, the OA 304, and the SBS component 306. As shown in FIG. 3 or FIG. 4, the pulse peak output by the OA 304 has an overshoot phenomenon, and P1 and P2 respectively represent a bottom and a top of the overshoot part, where the bottom P1 corresponds to a preset peak value, where the preset peak value herein represents a theoretical peak value of the pulse peak output by the OA 304 and may be also referred to as a nominal peak value or stable peak value, such as P1 shown in FIG. 3 or FIG. 4. In another embodiment of the present disclosure, the bottom of the overshoot part may also be referred to as a pulse peak baseline, and correspondingly, a value corresponding to the bottom, that is, the preset peak value, is also referred to as a pulse peak baseline value. In this specification, terms, the preset peak value, the theoretical peak value, the nominal peak value, the stable peak value, and the pulse peak baseline value are interchangeable. In an embodiment shown in FIG. 3 or FIG. 4, a peak higher than the preset peak value may be generated at a rising edge of the pulse, and the peak decreases from the top P2 to the bottom (that is, the preset peak value) P1. It should be understood that, in another embodiment, as shown in FIGS. 6A-6C, the overshoot part includes oscillation.

Correspondingly, the SBS threshold (that is, the minimum optical power of the part that needs to be limited) of the SBS component 306 may be set within an interval in which the overshoot part is located, that is, the SBS threshold is greater than or equal to P1 and less than P2. P2 may be obtained by measuring the OA 304, and a component manufacturer may perform a measurement operation and provide an indicator of a maximum value. P2 may be obtained by measuring by the detection module (not shown in the figure) coupled to an output end of the OA 304. The SBS threshold (that is, the minimum optical power of the part that needs to be limited) may also be determined according to a rate k of the P1 (which may be presented as k*P1) or according to P1 plus a headroom (which may be presented as P1+Δ, where Δ represents the headroom). In this way, a problem that P2 cannot be known may be resolved, thereby controlling amplitude of the overshoot part within an acceptable range, achieving an objective of reducing or canceling an overshoot, and meeting a transmission requirement. A value of k or Δ may be determined according to a system requirement, for example, k may be any value greater than or equal to 1 and less than or equal to 115%. In an embodiment, an increment rate of the SBS threshold to the preset peak value may be controlled to be 12.5%, or an increment rate of the SBS threshold to the preset peak value is controlled to be 1 dB (which is represented by a logarithm).

A lower part of FIG. 3 is a schematic diagram of a signal pulse. The DML 302 generates the optical pulse signal S1, and the OA 304 works in a saturation region and outputs the optical pulse signal S2 after amplifying the optical pulse signal S1, where a maximum value of a pulse peak is located at a rising edge and decreases from the maximum value P2 to the pulse peak baseline value P1 over duration of the pulse. A part between P1 and P2 is the overshoot part. The SBS component 306 restrains a part having optical power higher than the SBS threshold and outputs a part having optical power lower than the SBS threshold, that is, outputs the optical pulse signal S3. The SBS threshold is related to a pulse peak baseline value of the optical pulse signal S2, for example, FIG. 3 shows a schematic diagram obtained when the SBS threshold is equal to the pulse peak baseline value of the optical pulse signal S2. It should be understood that the SBS threshold may also be greater than the pulse peak baseline value of the optical pulse signal S2. In this way, a pulse waveform is not distorted, and a signal integrity can be ensured. Certainly, the SBS threshold may also be a little less than a pulse peak baseline of the optical pulse signal S2, and a small amount of waveform distortion is acceptable by a system. In this application, limiting or restraining, by the SBS component 306, an overshoot signal is referred to as overshoot apodisation, that is, cutting off an overshoot signal.

As shown in FIG. 3 or FIG. 4, according to an embodiment of the present disclosure, these signals S1, S2, and S3 may carry high-rate bit streams, where a rate may be greater than or equal to 1 gigabit per second (Gbps), for example, 2.5 Gbps, 10 Gbps, or 40 Gbps. The high-rate bit stream is presented as a high-rate electrical pulse signal on an input end of the DML 302 in order to be modulated into an optical pulse signal S1 using the DML 302.

In a direct modulator, because a modulation current causes a change in a refractive index of an active layer, a phase of light is modulated such that a working frequency is broadened, that is, there is a relatively large frequency chirp. Moreover, as a modulation rate increases, a chirp phenomenon is increasingly serious. Generally, the direct modulator generates a positive chirp. According to an embodiment of the present disclosure, the OA 304 is an optical amplifier capable of generating self-phase modulation (SPM). The SPM generated by the OA 304 can add a negative chirp to an optical pulse signal input to the OA 304. In this way, the negative chirp generated by the OA 304 may cancel at least a part of a positive chirp included in an output optical signal of the DML 302. The OA 304 may be an electrical drive optical amplifier or an electrical pump optical amplifier and can generate SPM. A semiconductor optical amplifier is one type of electrical drive amplifier. A terahertz (THz) amplifier is one type of electrical pump optical amplifier. A relationship between a negative chirp of an optical amplifier and SPM and a relationship between a direct modulator and a positive chirp are widely studied, and details are not described herein.

According to an embodiment of the present disclosure, a working point of the OA 304 may be set in a saturation region such that the OA generates SPM in order to provide a negative chirp. Correspondingly, the SBS threshold is related to an optical pulse peak that is output by the OA 304 when the OA 304 works in the saturation region. For example, the SBS threshold is equal to a pulse peak baseline value output by the OA 304 working in the saturation region or is a little greater than a pulse peak baseline value. For a case in which the SBS threshold is a little greater than the pulse peak baseline value, reference may be made to the foregoing description.

According to the foregoing implementation solution, when the OA 304 works in the saturation region, amplification of an optical pulse signal output by the DML 302 reaches a saturation point, and an SPM effect generated by the OA 304 working in the saturation region provides a negative chirp. Therefore, dispersion compensation is performed during amplification. According to another aspect, when working in the saturation region, the OA 304 easily generates an overshoot phenomenon. The SBS component 306 shapes an optical pulse signal output by the OA 304, to restrain or cut off an overshoot signal. The foregoing solution of the present disclosure is compact in structure, and in the foregoing solution, a cost-effective DML is used to generate a high-performance output optical signal. Therefore, the foregoing solution is an extremely effective solution.

In addition, a generation mechanism of SBS is an electromagnetic telescopic effect generated when incident light, such as S2 shown in FIG. 3, is injected into a nonlinear medium stimulates an ultrasonic wave in the substance, an incident optical signal S1 is scattered by the ultrasonic wave such that a frequency-shift optical signal, such as S4 shown in FIG. 3, in an opposite direction is generated. This stimulated scattering process may be considered as a coherent scattering process between a photon field and a phonon field. The S2 has a wavelength of $\lambda 1$, and the S4 in the opposite direction has a wavelength of $\lambda 2$. A difference between $\lambda 2$ and $\lambda 1$ is one SBS frequency difference. When optical power of an optical signal having the wavelength of $\lambda 1$ in the SBS component 306 reaches the SBS threshold, an optical signal transmitted in an opposite direction and having a wavelength of $\lambda 2$ is generated. The optical signal having the wavelength of $\lambda 2$ is referred to as a Stokes optical signal. When the SBS threshold is located at a pulse peak baseline of an optical pulse peak that is output by a semiconductor optical amplifier (SOA) when amplification of the SOA reaches a saturation point, overshoot energy above the baseline is converted into frequency-shift light in an opposite direction by means of SBS, and energy below the baseline is transmitted normally in a forward direction after apodisation. In this way, signal distortion and decreased transmission quality that are caused by a signal pulse leading-edge overshoot can be restrained using an apodisation effect of the SBS. Because SBS apodisation is to perform an operation on signal overshoot amplitude in a time domain, a signal below a threshold is not affected, no extra chirp is generated, and a signal chirp property after compensation using a negative chirp of an OA is well maintained.

In addition, for an optical amplifier not performing negative chirp compensation, for example, an erbium (Er)-doped fiber amplifier (EDFA), or an SOA working in a linear amplification region, the SBS apodisation in this embodiment of the present disclosure may also effectively restrain a signal overshoot when amplification reaches a saturation point.

According to an embodiment of the present disclosure, the OA 304 is a semiconductor laser, and the SBS threshold of the SBS component 306 is equal to a pulse peak baseline value that is output by the semiconductor laser when the semiconductor laser works in a saturation region.

The following describes a signal flow with reference to FIG. 3 using an example in which the OA 304 works in a saturation region and can generate SPM.

The DML 302 changes a modulation current using an input electrical pulse signal in order to generate a first optical pulse signal, such as S1 shown in FIG. 3. The electrical pulse signal may be generated by a drive and is related to a to-be-sent bit stream. The bit stream may be the high-rate bit stream mentioned above.

The OA 304 working in the saturation region amplifies the first optical pulse signal S1, generates SPM, and outputs a second optical pulse signal, such as S2 shown in FIG. 3.

The SBS component 306 reflects an optical signal, which has optical power higher than an SBS threshold, in the second optical pulse signal S2 using an SBS frequency difference, and the SBS threshold is related to a pulse peak baseline value of the second optical pulse signal S2. For a value range of the SBS threshold, reference may be made to the foregoing description.

According to an embodiment of the present disclosure, the optical transmit system 300 is in a working state, and the optical amplifier 304 works in a saturation region. The saturation region involved in this specification may be an approaching saturation region (or a shallow saturation region), or may be a deep saturation region. In this embodiment of the present disclosure, a positive chirp generated by a DML 302 is reduced or canceled using a negative chirp generated by an SPM effect of the optical amplifier 304, and an overshoot signal amplified by the OA 304 is restrained using the SBS component 306 in order to reduce signal nonlinear distortion and obtain a high-performance optical transmit signal. Correspondingly, because an optical transmit signal generated by this optical transmit system reaches a receive end by means of a transmission system, and receiving sensitivity of a receive end is improved, a requirement on sensitivity of a photo-electric detector of a receiver can be lowered. For example, receiving performance can be ensured with a cheaper positive-intrinsic-negative (PIN) diode rather than an expensive avalanche photodiode (APD). Particularly, in an application of a PON shown in FIG. 2, because one OLT may be connected to multiple ONUs, for example, 32, 64, and 128, the optical transmit system provided in this embodiment of the present disclosure is applied to the OLT, and PIN diodes are used in the ONUs to receive optical signals such that costs can be reduced when transmission performance is ensured, which facilitates popularization and application of fiber to the home.

According to this embodiment of the present disclosure, the optical transmit system further includes a control module (not shown in the figure), coupled to one or more of the DML 302, the OA 304, and the SBS component 306 and configured to control a working parameter of a corresponding component. For example, the control module may control working parameters of the DML 302 and the OA 306 such that a negative chirp added by the OA 304 compensates for a positive chirp of the DML 302. Furthermore, a working parameter that may be controlled may be a working point of the OA 304, for example, the working point is located at a downstream amplification region or a saturation region, where the saturation region may be further divided into a shallow saturation region and a deep saturation region. Certainly, the control module may perform a real-time calculation and determining according to a result obtained by detecting by a detection module. In another aspect, a working parameter that may be controlled may be a working point of the DML 302. Similarly, the control module herein is applicable to an optical transmit system shown in FIG. 4 or FIGS. 5A-5C. The control module may be a part of the optical transmit system, or may be connected to the optical transmit system using an interface. Referring to FIG. 4, FIG. 4 is a schematic diagram of an optical transmit system according to an embodiment of the present disclosure. As shown in FIG. 4, the optical transmit system 400 includes a DML 402, an OA 404, and an SBS component 406. If there is no special description, a function of each composition part of the optical transmit system 400 is similar to or the same as that in FIG. 3, and details are not described herein again. Particularly, the optical amplifier 404 may be an SOA. An SBS threshold of the SBS component 406 is equal to a pulse peak baseline of an optical pulse signal output by the optical amplifier 404. The SBS component 406 may use a high nonlinear fiber (HNF). The "high nonlinear" herein refers to that a nonlinear coefficient is relatively high, for example, a third order nonlinear coefficient is greater than or equal to 10 per watt ($W^{-1}$) per kilometer ($km^{-1}$). A high nonlinear medium or waveguide is generally a medium or waveguide doped with a specific type of element in order to obtain a relatively high nonlinear coefficient, for example, a fiber doped with one or more types of elements such as germanium, fluorine, and rare earth or a waveguide disposed on a semiconductor.

An HNF is used as the SBS component 406 to implement a pulse apodisation function. A high-rate modulated optical signal S1 output by the DML 402 is input to the optical amplifier 404, and the optical amplifier 404 works in a saturation region, where in one aspect, the optical amplifier 404 amplifies the input optical signal S1, and in another aspect, the optical amplifier 404 generates SPM to provide a negative chirp in order to compensate for dispersion. An SBS threshold of the HNF is located at a pulse peak baseline of an optical signal S2 output by the optical amplifier 404. After an optical signal S2 amplified by an SOA is input to the HNF, an overshoot peak located at a pulse leading-edge reaches the SBS threshold, and therefore a back-scattering optical signal S4 is generated, where a scattering wavelength is $\lambda 2$, and a difference between $\lambda 2$ and $\lambda 1$ is one SBS frequency difference. However, energy below the pulse peak baseline enters a single-mode fiber (SMF) through the HNF almost without fading. For a related parameter of the SMF, reference may be made to a description in the ITU-T G.652 standard. In this way, a signal overshoot caused by saturation of amplification of the optical amplifier 404 is effectively restrained by an SBS effect, and a negative chirp added by an SPM effect of the optical amplifier 404 is not affected (SBS apodisation does not involve a phase change). A low-frequency chirp signal after apodisation enters the SMF, thereby effectively reducing a dispersion penalty.

Referring to FIG. 6A, FIG. 6B and FIG. 6C, FIG. 6A, FIG. 6B and FIG. 6C are schematic diagrams of performance simulation of an optical transmit system according to an embodiment of the present disclosure. For example, a rate of an electrical pulse signal is 10 Gbps, and then, transmit power of a DML is 3.97 decibel-milliwatt (dBm), an extinction ratio is 6 dB, and an optical pulse signal output by the DML is shown in FIG. 6A. The optical amplifier 404 works in a shallow saturation region, output signal power is about 16 dBm, a signal extinction ratio is 5 dB, and an optical pulse signal output by the optical amplifier 404 is shown in FIG. 6B. An SBS threshold of the SBS component 406 is 17 dBm (which is a little greater than the output signal power 16 dBm of the optical amplifier 404), and an optical pulse signal output by the SBS component 406 is shown in FIG. 6C. Herein, dBm is a unit of optical power and represents a value of optical power in a logarithm domain, and the value herein is a logarithm value using 10 as a base. In FIG. 6A, FIG. 6B and FIG. 6C, ps is an abbreviation of picosecond.

Figure 7A:
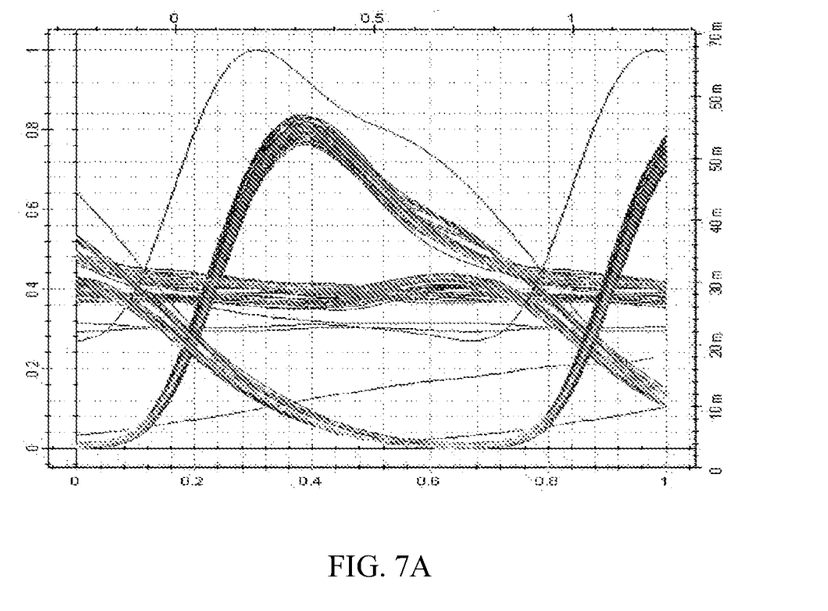
FIG. 7A and FIG. 7B are schematic diagrams of a receive eye pattern according to an embodiment of the present disclosure.
Figure 7B:
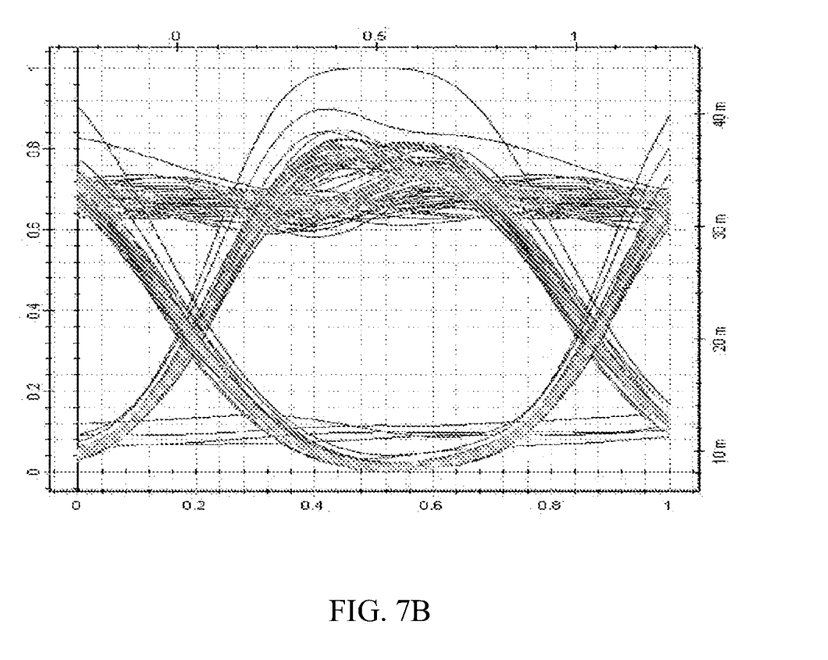

Referring to FIG. 7A and FIG. 7B, FIG. 7A and FIG. 7B are a receive eye pattern. FIG. 7A shows a receive eye pattern obtained after an optical signal output by an optical transmit system not including the SBS component 406 is transmitted through a 20-km fiber, that is, a receive eye pattern obtained after an optical signal of the DML 402 is directly transmitted through a 20-km fiber after being amplified by the optical amplifier 404. FIG. 7B is a receive eye pattern obtained after an optical signal output by an optical transmit system 400 including the SBS component 406 is transmitted through a 20-km fiber. As can be clearly seen from FIG. 7A, an eye pattern that is not processed by means of SBS has a serious overshoot phenomenon, and signal distortion leads to a relatively small receive eye, severe interference, and sharply decreased receiving sensitivity. However, in FIG. 7B, an overshoot of a receive pulse that is processed by means of SBS is effectively restrained, signal interference is low, an eye is open, and an extinction ratio is also significantly improved.

For SBS pulse apodisation, system simulation is performed for optimization of a dispersion penalty and a power budget of a DML+SOA transmission system. Table 1 is a table of a dispersion penalty and a power budget of a system. A receive end receives, using a 10 Gbps PIN diode, all dispersion penalties and power budgets that are tested when the bit error rate (BER)=10E-4 and are generated by direct sending of a DML, direct sending of a DML+OA, and a DML+OA+HNF (an SBS effect). Obviously, in a system using SBS apodisation, a dispersion penalty can be effectively decreased to 1.4 dB, and a power budget reaches 33.2 dB such that receiving of a PIN diode meets an index.

TABLE 1

| System | B2B (dBm) | 20 km (dBm) | DP (dB) | PB (dB) |
|---|---|---|---|---|
| DML | −19.5 | −12.1 | 7.4 | 16.07 |
| DML + OA | −15.8 | −12.5 | 3.3 | 28.5 |
| DML + OA + SBS | −18.6 | −17.2 | 1.4 | 33.2 |

In Table 1, B2B is short for back to back and refers to a transmit end of an optical transmit system and a receive end of an optical receive system coupled to the optical transmit system. DP is short for dispersion penalty, and PB is short for power budget. The dispersion penalty and the power budget are general technical terms in the art and details are not described herein.

Figure 5A:
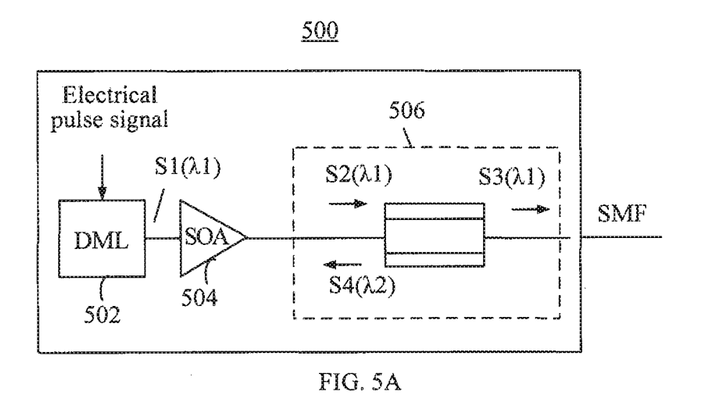
FIG. 5A, FIG. 5B and FIG. 5C are schematic diagrams of an optical transmit system according to an embodiment of the present disclosure.
Figure 5B:
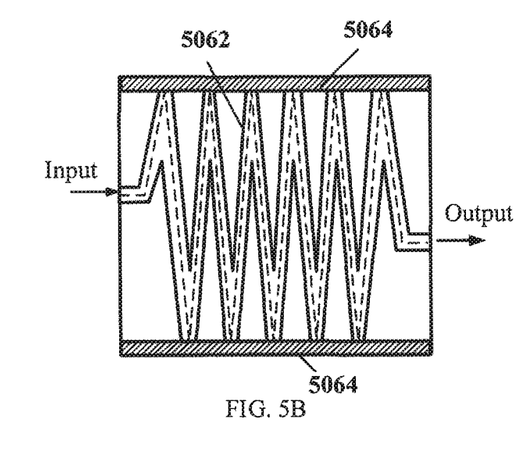
Figure 5C:
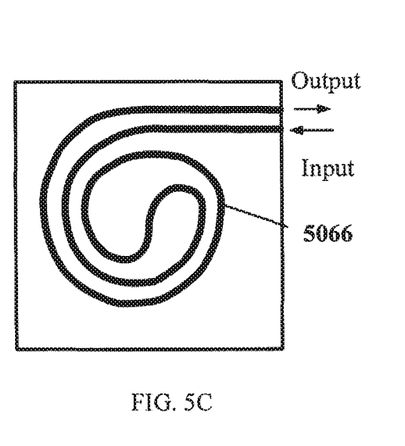

Referring to FIG. 5A, FIG. 5B and FIG. 5C, FIG. 5A. FIG. 5B and FIG. 5C are schematic diagrams of an optical transmit system according to an embodiment of the present disclosure. As shown in FIG. 5A, the optical transmit system 500 includes a DML 502, an OA 504, and an SBS component 506. If there is no special description, a function of each composition part of the optical transmit system 500 is similar to or the same as that in FIG. 3 or FIG. 4, and details are not described herein again. Particularly, the OA 504 may be a SOA. An SBS threshold of the SBS component 506 is equal to a pulse peak baseline of an optical pulse signal output by the optical amplifier 504. The SBS component 506 may be an SBS component of a waveguide-type structure, or may also be the HNF in FIG. 4. The SBS component of a waveguide-type structure in FIG. 5A has a relatively high integration level, which facilitates integration of optical sub-assemblies. When the waveguide-type SBS component 506 has a threshold the same as that of the HNF, an SBS length may be scaled down to below 10 centimeter (cm). If the size further needs to be reduced, a folded reflective waveguide structure shown in FIG. 5B or a spiral waveguide structure shown in FIG. 5C may be used, where the two structures both increase space utilization and can reduce a waveguide size to below a millimeter (mm) level, which facilitates module integration. As shown in FIG. 5B, the SBS component 506 includes a folded reflective waveguide 5062 and a reflective medium layer 5064, where the reflective medium layer 5064 may include a first reflective medium layer and a second reflective medium layer, and the folded reflective waveguide 5062 is located between the first reflective medium layer and the second reflective medium layer. The folded reflective waveguide 5062 is an SBS medium having an SBS threshold. A reflective medium layer may have a high reflectivity, for example, the reflectivity may be greater than and equal to 90%. To reduce losses, the reflectivity may be greater than and equal to 98%, and even greater than or equal to 99%. As shown in FIG. 5C, the SBS component 506 includes a spiral waveguide 5066. Similar to the folded reflective waveguide 5062, the spiral waveguide 5066 is an SBS medium having an SBS threshold. The SBS medium is a nonlinear medium having an SBS optical property.

Each of the optical transmit systems 300, 400, and 500 provided in the embodiments of the present disclosure is applicable to the PON system shown in FIG. 2, and not only may be a part of an OLT, but also may be a part of an ONU. Referring to FIG. 2, if any one of the optical transmit systems 300, 400, and 500 is used as a part of an optical module 212, a PIN diode is used in as an optical module 222 of an ONU 220. In this way, the system not only meets a transmission performance requirement, but also can reduce costs of the optical network terminal, which facilitates popularization of fiber to the home. The PIN diode refers to a diode of a PIN structure, which is formed by adding a thin-layer lightly-doped intrinsic semiconductor layer between P and N semiconductor materials. It should be understood that, the optical transmit systems 300, 400, and 500 not only are applicable to a PON system, but also are applicable to another optical network system.

Each of the optical transmit systems 300, 400, and 500 in the foregoing embodiments may be an integrally packaged optical sub-assembly. The pulse peak is a commonly-used term in the art and corresponds to a high-level signal. Correspondingly, a low-level signal corresponds to a pulse valley. The positive chirp and the negative chirp mentioned in this specification may correspond to pulse frequency chirps, that is, offsets of pulse frequencies.

A person of ordinary skill in the art should understand that some functions (such as processing a detection signal and/or a control function of components) in the embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

When multiple embodiments having a same or similar part are described in this specification, for the latter embodiment, a different part is emphasized, and for the same or similar part, reference may be made to embodiments. An apparatus embodiment is basically similar to a method embodiment, and therefore is described briefly. For related parts, reference may be made to partial descriptions in the method embodiment.

It should be understood that, if there is no special description, "being equal to" mentioned in this specification may represent a meaning of "generally being equal to", which includes a meaning of "being approximately equal to" or "approximating to". Therefore, in the solutions provided in this specification, "being equal to", "generally being equal to", "being approximately equal to", and "approximating to" are interchangeable.

If there is no special description, "connect" mentioned in this specification may represent "being directly or indirectly connected", for example, "A is connected to B" represents "A is directly or indirectly connected to B". If there is no special description, "couple" mentioned in this specification may represent relationships such as "connecting", "including", "being included", and "attaching".

"An embodiment" or "one embodiment" mentioned in this specification means that specific features, structures, or properties related to an embodiment is included in at least one embodiment of the present disclosure. Therefore, "in an embodiment" or "in one embodiment" in the whole specification not necessarily refers to a same embodiment. In addition, these specific features, structures, or properties may be combined in one or more embodiments in any proper manner.

In short, the foregoing descriptions are merely exemplary embodiments of the present disclosure, but are not intended to limit the protection scope of the present disclosure. The technical solutions disclosed in the claims also fall within the protection scope of the embodiments of the present disclosure. Any modification, equivalent replacement, or improvement made without departing from the spirit and principle of the present disclosure shall fall within the protection scope of the present disclosure.

What is claimed is:

1. An optical transmit system, comprising:
a direct modulator configured to generate an optical signal;
an optical amplifier coupled to the direct modulator and configured to amplify the optical signal output by the direct modulator; and
a stimulated Brillouin scattering component coupled to the optical amplifier and configured to:
limit optical power of the optical signal output by the optical amplifier, wherein a stimulated Brillouin scattering threshold of the stimulated Brillouin scattering component is equal to a minimum optical power of a part, which needs to be limited, of the optical signal output by the optical amplifier; and
reflect, using a stimulated Brillouin scattering frequency difference, a part, which has optical power higher than the minimum optical power, of the optical signal output by the optical amplifier in order to limit outputting of this part of the optical signal.

2. The system according to claim 1, wherein a pulse peak of the optical signal output by the optical amplifier comprises an overshoot part, wherein the overshoot part represents a part having optical power higher than a preset peak value output by the optical amplifier, and wherein the minimum optical power is greater than or equal to a bottom of the overshoot part and less than a top of the overshoot part.

3. The system according to claim 1, wherein a pulse peak of the optical signal output by the optical amplifier comprises an overshoot part, wherein the overshoot part represents a part having optical power higher than a preset peak value output by the optical amplifier, and wherein a ratio of the minimum optical power to the preset peak value is greater than or equal to 1 and less than or equal to 115%.

4. The system according to claim 1, wherein the optical amplifier is an optical amplifier capable of generating a self-phase modulation effect.

5. The system according to claim 1, wherein the stimulated Brillouin scattering component is a high nonlinear fiber.

6. The system according to claim 1, wherein the stimulated Brillouin scattering component is a stimulated Brillouin scattering component having a waveguide-type structure.

7. The system according to claim 1, wherein the optical transmit system is an integrally packaged optical sub-assembly.

8. The system according to claim 1, wherein the optical transmit system is applied to an optical line terminal of a passive optical network system, and wherein the optical transmit system is configured to send the optical signal to an optical network unit connected to the optical line terminal.

9. The system according to claim 1, wherein the optical transmit system is applied to an optical network terminal of a passive optical network system, and wherein the optical transmit system is configured to send the optical signal to an optical line terminal connected to the optical network terminal.

10. The system according to claim 4, wherein the optical amplifier is an electrical drive optical amplifier.

11. The system according to claim 4, wherein the optical amplifier is an electrical pump optical amplifier.

12. The system according to claim 6, wherein the stimulated Brillouin scattering component is a component having a folded reflective waveguide structure and comprises a first reflective medium layer and a second reflective medium layer, wherein there is a folded reflective waveguide between the first reflective medium layer and the second reflective medium layer, and wherein the folded reflective waveguide is a stimulated Brillouin scattering medium.

13. The system according to claim 6, wherein the stimulated Brillouin scattering component is a component having a spiral waveguide structure and comprises a spiral waveguide, wherein the spiral waveguide is a stimulated Brillouin scattering medium.

14. The system according to claim 10, wherein the optical amplifier is a semiconductor optical amplifier.

15. The system according to claim 11, wherein the optical amplifier is a semiconductor optical amplifier.

16. The system according to claim 14, wherein a working point of the semiconductor optical amplifier is set in a saturation region.

17. The system according to claim 15, wherein a working point of the semiconductor optical amplifier is set in a saturation region.

18. An optical transmit system, comprising:
a direct modulator configured to generate an optical signal;
a semiconductor optical amplifier coupled to the direct modulator configured to amplify the optical signal output by the direct modulator; and
a stimulated Brillouin scattering component coupled to the semiconductor optical amplifier configured to:
limit optical power of the optical signal output by the semiconductor optical amplifier, wherein a ratio of a stimulated Brillouin scattering threshold of the stimulated Brillouin scattering component to a pulse peak baseline value of the semiconductor optical amplifier when the semiconductor optical amplifier works in a saturation region is greater than or equal to 1 and less than or equal to 115%; and
reflect, using a stimulated Brillouin scattering frequency difference, a part, which has optical power higher than the stimulated Brillouin scattering threshold, of the optical signal output by the semiconductor optical amplifier in order to limit outputting of this part of the optical signal.

19. The system according to claim 18, wherein the stimulated Brillouin scattering component is a component having a folded reflective waveguide structure and comprises a first reflective medium layer and a second reflective medium layer, wherein there is a folded reflective waveguide between the first reflective medium layer and the second reflective medium layer, and wherein the folded reflective waveguide is a stimulated Brillouin scattering medium.

20. The system according to claim 19, wherein a pulse peak of the optical signal output by the semiconductor optical amplifier comprises an overshoot part, wherein the overshoot part represents is part having optical power higher than a preset peak value output by the semiconductor optical amplifier, wherein a stimulated Brillouin scattering threshold of the stimulated Brillouin scattering component is equal to a minimum optical power of a part, which needs to be limited, of the optical signal output by the semiconductor optical amplifier, and wherein the minimum optical power is greater than or equal to a bottom of the overshoot part and less than a top of the overshoot part.

* * * * *